(12) United States Patent
Surpi (10) Patent No.: US 9,595,191 B1
(45) Date of Patent: Mar. 14, 2017

(54) TRAFFIC ESTIMATION (71) Applicant: Lytx, Inc., San Diego, CA (US)

(72) Inventor: Gabriela Surpi, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/939,998

(22) Filed: Nov. 12, 2015

(51) Int. Cl.
*G08G 1/01* (2006.01)
*G08G 1/052* (2006.01)
*G07C 5/08* (2006.01)
*B60W 40/04* (2006.01)

(52) U.S. Cl.
CPC ............ *G08G 1/0125* (2013.01); *B60W 40/04* (2013.01); *G07C 5/085* (2013.01); *G08G 1/0137* (2013.01); *G08G 1/052* (2013.01)

(58) Field of Classification Search
CPC .... G08G 1/0125; G08G 1/052; G08G 1/0137; G08G 1/161; G07C 5/085; G07C 5/0841; B60W 40/04
See application file for complete search history.

(56) References Cited

U.S. PATENT DOCUMENTS

| 7,804,423 | B2 * | 9/2010 | Mudalige | G08G 1/161 340/902 |
| 7,859,392 | B2 * | 12/2010 | McClellan | G01S 5/0027 180/170 |
| 8,452,771 | B2 * | 5/2013 | Kurciska | G06F 17/30241 701/423 |
| 2010/0036595 | A1 * | 2/2010 | Coy | G08G 1/0104 701/119 |
| 2013/0085655 | A1 * | 4/2013 | Kii | B60K 31/18 701/103 |
| 2014/0358326 | A1 * | 12/2014 | Phelan | G06Q 40/00 701/1 |

FOREIGN PATENT DOCUMENTS

| EP | 1398203 | A2 * | 3/2004 |
| JP | 2005-225424 | * | 8/2005 |
| JP | 2015-18396 | * | 1/2015 |

\* cited by examiner

*Primary Examiner* — Michael J Zanelli
(74) *Attorney, Agent, or Firm* — Van Pelt, Yi & James LLP (57) ABSTRACT

A system for using a traffic proxy measure includes an input interface and a processor. The input interface is to receive a vehicle data and a road data. A processor is to determine a traffic proxy measure based at least in part on the vehicle data and the road data.

23 Claims, 10 Drawing Sheets

TRAFFIC ESTIMATION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. In order to identify anomalous events accurately, thresholds for detecting anomalous events can be modified based on measured external conditions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traffic estimation is disclosed. The system for traffic estimation comprises an interface and a processor. The interface is to receive vehicle data and road data. The processor is to determine a traffic proxy measure based at least in part on the vehicle data and the road data. In some embodiments, the system further comprises a memory coupled to the processor and configured to provide the processor with instructions.

In some embodiments, a system using a traffic proxy measure comprises an input interface, processor, and a remote server. The input interface is to receive vehicle data and road data. In various embodiments, vehicle data and/or road data comprise a vehicle speed (e.g., from a global positioning system (GPS), a vehicle sensor, etc.), a posted speed (e.g., from a posted speed database, using map data, using GPS data, from an image of a speed limit sign—for example, where the image is from an event recorder in the vehicle, etc.), a road class, a road type (e.g., where the road type is acquired using a map data, using a GPS data, etc.), data from sensors detecting surrounding vehicles, and measuring the distance to them and their speed, or any other appropriate vehicle data and/or road data. In various embodiments, the processor is to determine a traffic proxy measure based at least in part on one or more of the following: the vehicle speed, the posted speed, the road class, the data regarding surrounding vehicles; to determine whether to record data and/or transmit data to a server based at least in part on the traffic proxy measure, and in the event it is determined to record and/or transmit data, record and/or transmit the data, or any other appropriate determination. In some embodiments, the traffic proxy measure comprises a ratio of a vehicle speed and a posted speed. In some embodiments, a decision is made based at least in part on the vehicle proxy measure being less than a threshold (e.g., where the threshold comprises 0.9, 0.5, 0.3, 0.2, 0.1, much less than 1, etc.). In some embodiments, a decision is made based at least in part on the vehicle proxy measure being less than a threshold for more than a threshold number of times.

In various embodiments, a system for traffic estimation makes an estimate of current traffic conditions based at least in part on a vehicle speed, a posted speed (e.g., a posted speed limit), a road class (e.g., low speed road within neighborhoods, moderate speed road within neighborhoods, moderate speed road within cities, quick travel road between and through cities, high speed road, off road, etc.), or on any other appropriate estimation factor. In some embodiments, a system for traffic estimation makes an estimate of the traffic conditions based at least in part on nearby vehicles detected.

The system for traffic estimation comprises part of a vehicle event recorder mounted on a vehicle. The vehicle event recorder comprises and/or is in communication with a set of sensors (e.g., accelerometers, global positioning system sensors (GPS), video and audio sensors, vehicle state sensors, etc.). The vehicle event recorder determines anomalous vehicle events (e.g., accidents, loss of driver control events, hard maneuvering events, etc.) based at least in part on the sensor data. In some embodiments, the vehicle event recorder compares processed sensor data with one or more vehicle event recorder thresholds in order identify anomalous vehicle events. The system for traffic estimation receives the vehicle speed, the posted speed, the road class and sometimes surrounding vehicles detected and determines a traffic proxy measure. In some embodiments, the traffic proxy measure comprises the ratio of the vehicle speed to the posted speed. In some embodiments, in the event that the posted speed limit is not reported the posted speed is estimated from the road class. In some embodiments, the distance to a forward vehicle or multiple surrounding vehicles is used to estimate traffic. In some embodiments, the speed of surrounding vehicles is used to estimate traffic. The traffic proxy measure comprises an estimate of current traffic conditions. The traffic proxy measure is then used to determine whether event data is to be collected, and whether event data is to be transmitted to a server. In some embodiments, in the event the traffic proxy measure indicates heavy traffic, the vehicle event recorder thresholds are modified to increase likelihood of detection of an event. In some embodiments, situations involving heavy traffic are more dangerous than situations involving moderate or low traffic, and so should be watched more carefully for anomalous events by the vehicle event recorder. In some embodiments, situations involving light traffic are less dangerous than situations involving moderate or high traffic, and so should be watched less carefully for anomalous events by the vehicle event recorder. In some embodiments, in the event the traffic proxy measure indicates light traffic, the vehicle event recorder thresholds are modified to decrease likelihood of detection of an event.

In some embodiments, the system determines a traffic proxy measure. In some embodiments, the traffic proxy measure is estimated at least in part from the ratio between a vehicle speed and a posted speed. For example, in the event that the ratio is less than or equal to 0.5 (e.g., a first threshold), the traffic proxy is determined to be heavy traffic; in the event that the ratio is greater than 0.5 and less than or equal to 0.9 (e.g., a second threshold), the traffic proxy is determined to be medium traffic; and in the event that the ratio is greater than 0.9, the traffic proxy is determined to be no traffic.

In some embodiments, in the event that the posted speed limit is not available, the posted speed is estimated from the road class. For example, a low speed road within a neighborhood is assigned a first estimated posted speed of 25 Mph, a moderate speed road within a neighborhood is assigned a second estimated posted speed of 35 Mph, a moderate speed road within a city is assigned a third estimated posted speed of 45 Mph, a quick travel road between and through cities is assigned a fourth estimated posted speed of 55 Mph, and a high speed road is assigned a fifth estimated posted speed of 65 Mph.

In some embodiments, the traffic proxy measure is estimated based at least in part on the speed of surrounding vehicles. For example, in the event that a car is travelling at 40 Mph on a highway with a posted speed limit of 65 Mph, one traffic proxy estimate based on the ratio of actual speed to posted speed (e.g., 0.62) is medium traffic. However, in some embodiments, a sensor is available for determining vehicle speed for vehicles surrounding the vehicle. For example, in the event that a sensor for determining vehicle speed of vehicles surrounding the vehicle determines that a forward vehicle and in adjacent lanes are traveling at a relatively higher speed (e.g., above 60 Mph compared to 40 Mph for the vehicle), a traffic proxy estimate is then low traffic with the vehicle likely going slow due to some particular circumstances—for example, a mechanical malfunction, a heavy load, or a driver distraction. Conversely, as another example, in the event that a vehicle is driving on a highway at 60 Mph, which using the ratio of vehicle speed to posted speed gives a traffic proxy estimate of low traffic. However, in the event that there is a sensor available for determined vehicle speed for vehicles surrounding the vehicle and the sensor detects that multiple vehicles in adjacent lanes are driving at a relatively lower speed (e.g., under 45 Mph), the traffic proxy estimate is then an estimate of medium traffic and that the vehicle is going too fast for conditions (e.g., most lanes are getting backed up, perhaps due to a freeway merge from the right, and the vehicle is moving rapidly compared to surrounding vehicles).

In some embodiments, the distance to a forward vehicle is used to estimate traffic. For example, a car driving at 10 Mph on a low speed road within a neighborhood, where a posted speed limit is not available but is estimated at 25 Mph; using the ratio a proxy estimate for traffic yields an estimate of heavy traffic; however in the event that a sensor for detection of surrounding vehicles indicates no forward vehicle within close range, the traffic proxy estimate is that there is no traffic (e.g., perhaps the driver is going slow because he is searching for address).

In some embodiments, the traffic proxy is estimated from the distance detected to surrounding vehicles—for example, in the event that the vehicle is moving and one or more other vehicles is/are detected a) within a first distance (e.g., 30 meters) during a time window (e.g., 60 seconds), the traffic proxy is estimated as heavy traffic; b) within a second distance (e.g., 50 meters) during a time window (e.g., 60 second) time window, the traffic proxy is estimated as medium traffic; c) within a third distance (e.g., 100 meters) during a time window (e.g., 60 seconds), the traffic proxy is estimated as low traffic; d) and beyond a fourth distance (e.g., 100 meters) or no vehicles detected within a time window (e.g., 60 seconds), the traffic proxy is estimated as no traffic.

In some embodiments, in the event the traffic proxy estimate indicates traffic, different vehicle event recorder thresholds are used to increase likelihood of detection of an event—for example, while the standard lateral acceleration threshold to record a video is 0.4 g, in heavy traffic a threshold of 0.3 g is used (e.g. a reduction in threshold value to increase sensitivity) to increase detection of distracted drivers that needed to swerve to avoid a forward vehicle, or drivers that are changing lanes aggressively. In another example, a first threshold time period of 2.5 seconds for a driver not looking at the road is set for a driver while the vehicle is moving to indicate that the driver is distracted; for in traffic conditions the threshold is made more sensitive and lowered to 1.5 seconds as the conditions are risky and the driver should stay more focused on the road.

In some embodiments, when multiple videos have been recorded but only a subset is selected for upload to the server due to cost or bandwidth constraints, the selection criteria are based at least in part on the traffic proxy conditions—for example, in a case where 2 videos have been triggered and recorded due to very similar readings from the accelerometer, a video associated with heavier traffic conditions is selected because its expected risk and probability of showing a coachable behavior are higher.

In various embodiments, the traffic proxy estimate and/or the sensor data used to calculate it are continuously recorded—for example, the vehicle speed, posted speed, road class, the number of surrounding vehicles detected, their distance and their speed is recorded every second, etc., or any other appropriate values are recorded.

In various embodiments, a summary or values per trip of the traffic proxy estimate is/are recorded—for example, trip start time; trip end time; trip length in miles; total time, and total distance driven in each traffic qualitative measure: heavy, medium, low, and no traffic; total time and total distance driven for traffic proxy estimate for each type of road class, or any other appropriate values are recorded.

In some embodiments, the recorded continuous traffic proxy measurement or the traffic proxy summary over each trip is uploaded to a server and used to estimate environmental risk due to the traffic faced by each driver. In the some embodiments, the environmental risk due to traffic conditions is used at least in part to estimate the probability that a driver is going to enter into a future collision. In some embodiments, the environmental traffic conditions are used at least in part estimate fuel efficient per driver.

In various embodiments, a traffic proxy estimation is done instantaneously (e.g., recalculated with each data sample), averaged over a time window (e.g., calculated using a summary value of the speed/posted speed over the last 5 seconds), or any other appropriate manner of calculation of a traffic proxy measure.

In some embodiments, the traffic proxy is an input to a model that predicts risk, the model outputs a risk score and in the event that the risk score is over a threshold, the video or data is recorded or transmitted. In various embodiments, There are many models running at the event recorder using a traffic proxy measure as input—for example, a model predicting the risk of a collision, a model predicting risk associated with being distracted, or any other appropriate model, and these models are used to determine a decision (e.g., store or record data, transmit data, raise or lower a threshold for determining an event, etc.).

Figure 1:
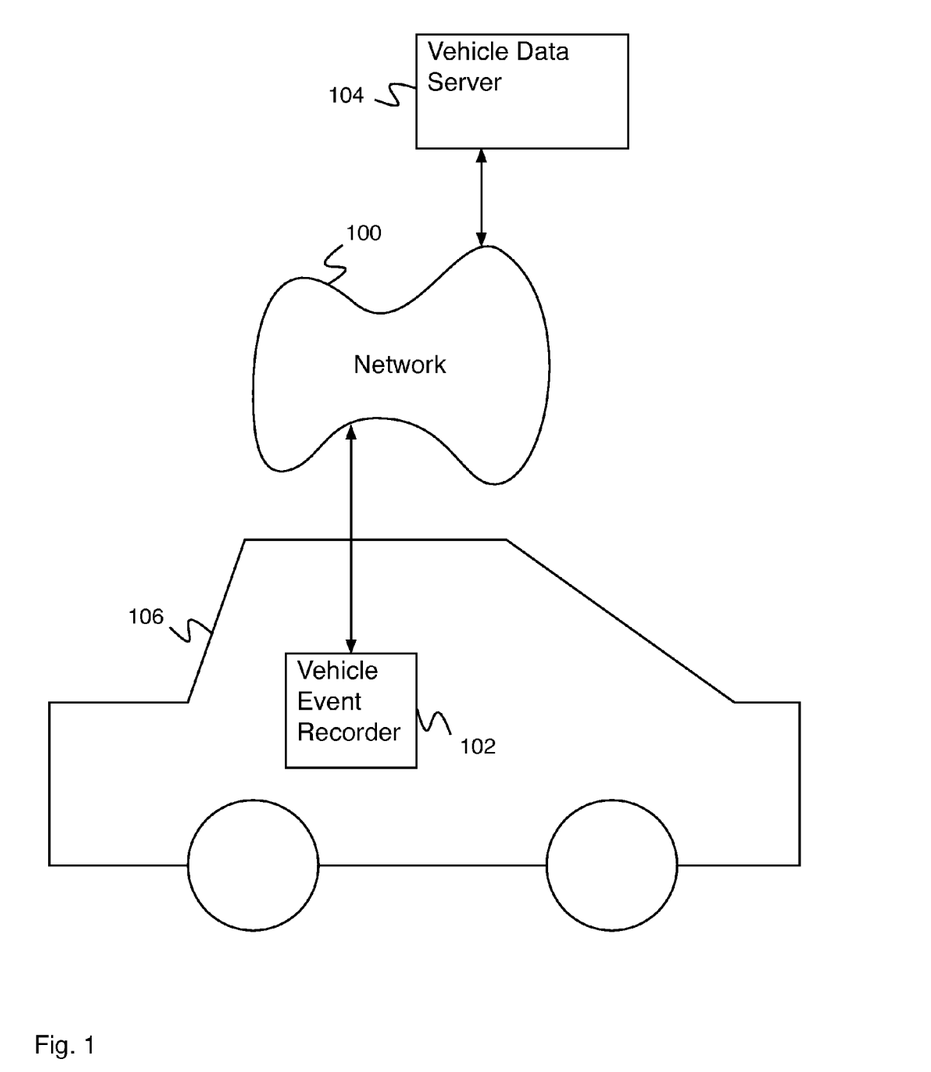
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In various embodiments, proximity sensors comprise one or more of the following: machine vision, radar, or any other appropriate technology to detect distance to nearby vehicles and/or their speed. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for traffic estimation.

Figure 2:
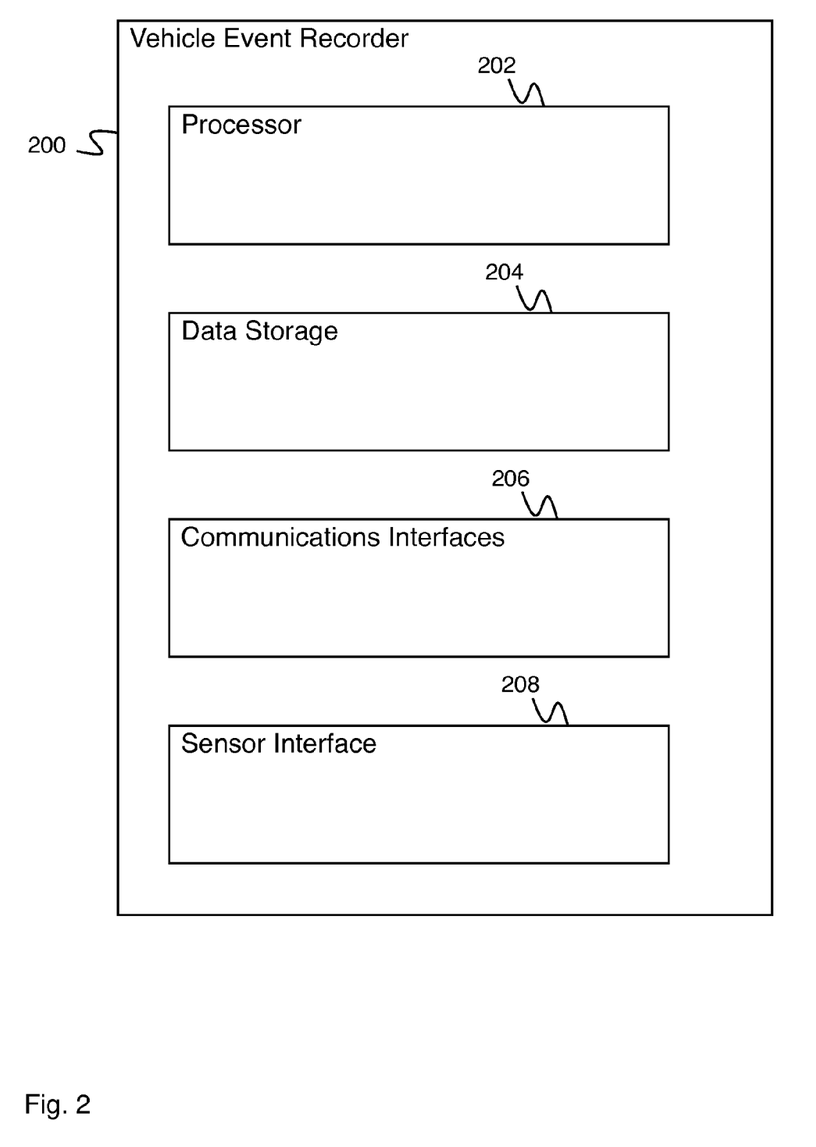
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In some embodiments, data storage 204 comprises a posted speed database. In some embodiments, the posted speed database uses map data to determine a posted speed. In some embodiments, the posted speed database uses GPS data to determine a posted speed. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Figure 3:
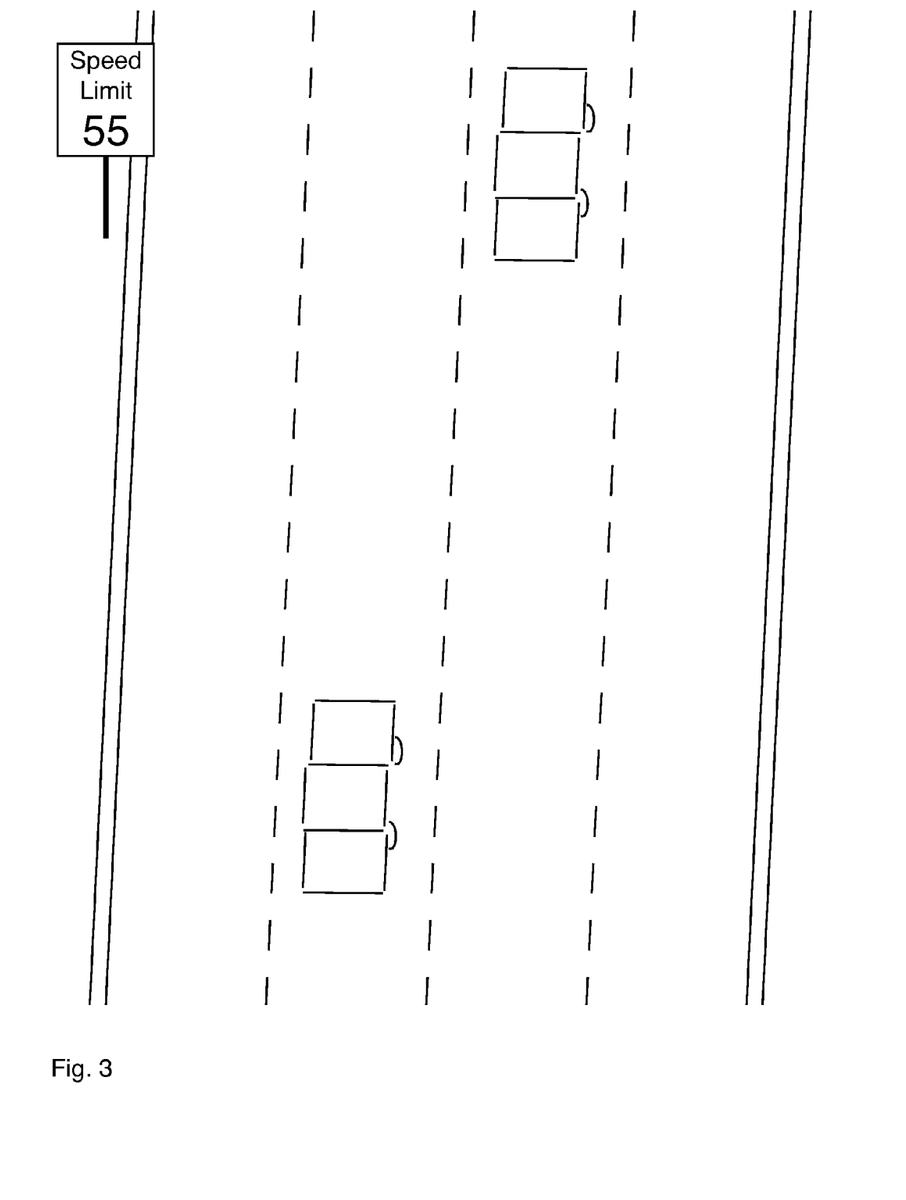
FIG. 3 is a diagram illustrating an embodiment of a road with sparse traffic.

FIG. 3 is a diagram illustrating an embodiment of a road with sparse traffic. In the example shown, two cars are shown driving on the road of FIG. 3. In some embodiments, one or more of the cars on the road of FIG. 3 each includes a vehicle event recorder (e.g., vehicle event recorder 200 of FIG. 2). In the example shown, the posted speed (e.g., the speed limit) is 55 miles per hour. In the example shown, the two cars on the road of FIG. 3 are not constrained by traffic, so they are free to go any speed up to the posted speed. In some embodiments, a car unimpeded by traffic will typically go approximately the posted speed. In some embodiments, a vehicle event recorder comprising a system for traffic estimation that measures its vehicle traveling at approximately the posted speed limit (e.g., traffic speed divided by posted speed is approximately equal to 1) will estimate that traffic is low (e.g., sparse enough that it does not constrain the traffic speed).

Figure 4:
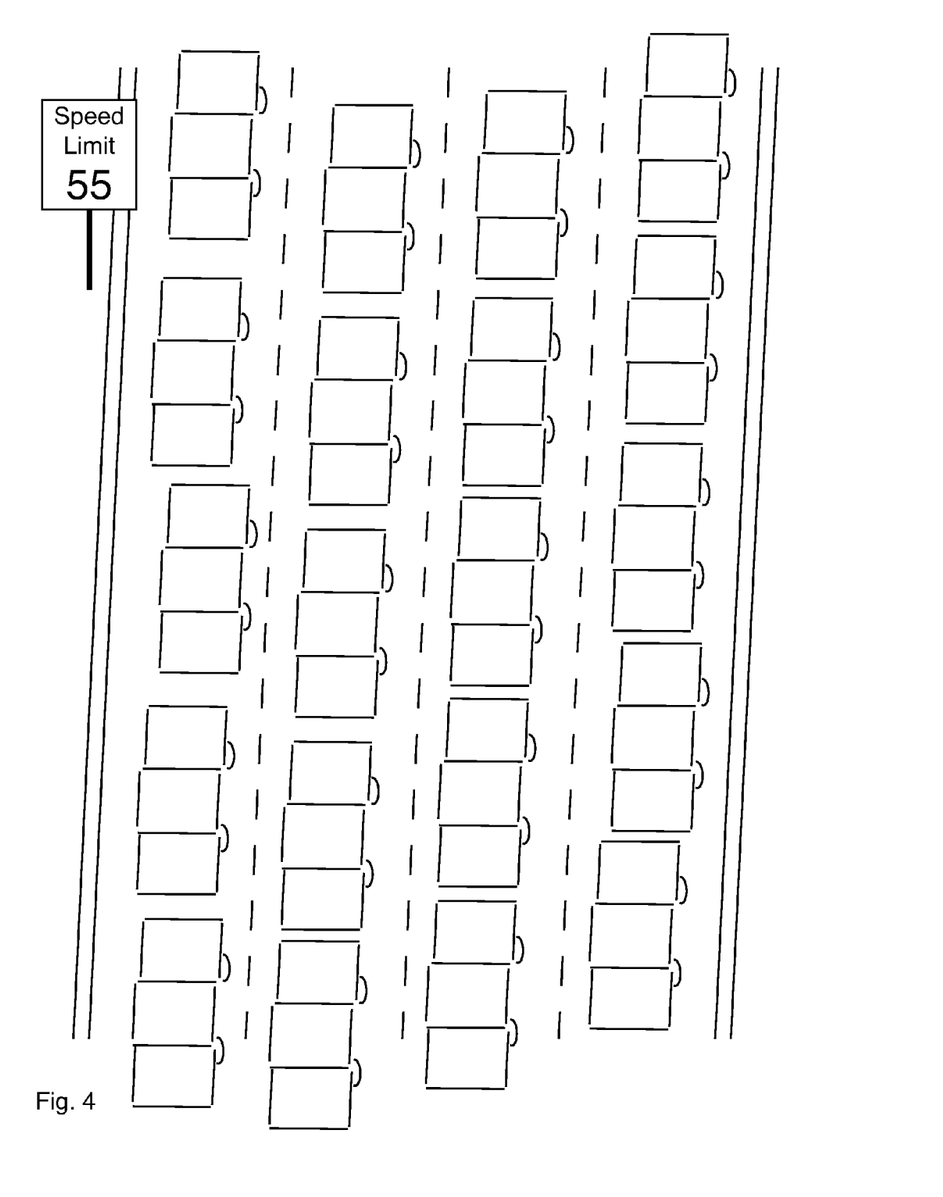
FIG. 4 is a diagram illustrating an embodiment of a road with heavy traffic.

FIG. 4 is a diagram illustrating an embodiment of a road with heavy traffic. In some embodiments, the road of FIG. 4 comprises the road of FIG. 3 with considerably higher traffic. In the example shown, twenty cars are shown driving on the road of FIG. 4 (e.g., in the same amount of space as the two cars of FIG. 3). In some embodiments, one or more of the cars on the road of FIG. 4 each includes a vehicle event recorder (e.g., vehicle event recorder 200 of FIG. 2). In the example shown, the posted speed (e.g., the speed limit) is 55 miles per hour. In the example shown, the density of the cars on the road is high enough that traffic must move considerably slower than the posted speed in order to move safely. In some embodiments, the average traffic speed changes as the inverse of the traffic density. In some embodiments, traffic of the density shown on the road of FIG. 4 typically moves at a rate of 5 miles per hour. In some embodiments, a vehicle event recorder comprising a system for traffic estimation that measures its vehicle traveling at 5 miles per hour in a region where the posted speed is 55 (e.g., traffic speed divided by posted speed is less than 0.1) will estimate that traffic is very high (e.g., because the traffic speed is highly constrained).

Figure 5A:
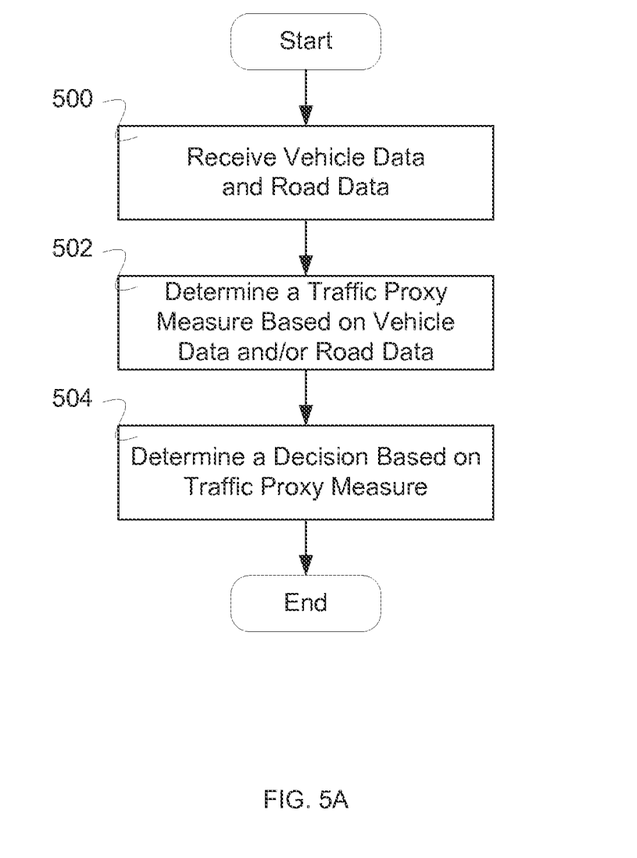
FIG. 5A is a flow diagram illustrating an embodiment of a process for traffic estimation.

FIG. 5A is a flow diagram illustrating an embodiment of a process for traffic estimation. In some embodiments, the process of FIG. 5A is executed by vehicle event recorder 200 of FIG. 2. In the example shown, in 500, a vehicle data and a road data are received. In various embodiments, a vehicle data, comprising a vehicle speed, is received from a GPS, from a vehicle speedometer, from video data, or from any other appropriate sensor data. In various embodiments, vehicle data comprises sensor data that provides a distance to a vehicle nearby and the speed of the vehicle nearby. In various embodiments, a road data, comprising a posted speed, is determined from map data (e.g., in conjunction with GPS data), from captured images of a speed limit sign (e.g., still images, video images, etc.), by querying a vehicle data server for a posted speed, or is determined in any other appropriate way. In some embodiments, the road data comprises a road type or road class. In 502, a traffic proxy measure is determined based at least in part on the vehicle data and the road data. In some embodiments, the traffic proxy measure is based at least in part on the ratio of the vehicle speed and the posted speed. In some embodiments, the traffic proxy measure is based at least in part on a distance or a speed of a nearby vehicle. In some embodiments, the posted speed is estimated based at least in part on a road class or a road type. In 504, a decision is determined based on a traffic proxy measure. For example, an event recorder threshold is updated, it is determined whether to record event data, it is determined whether to transmit event data to a server, or any other appropriate decision.

Figure 5B:
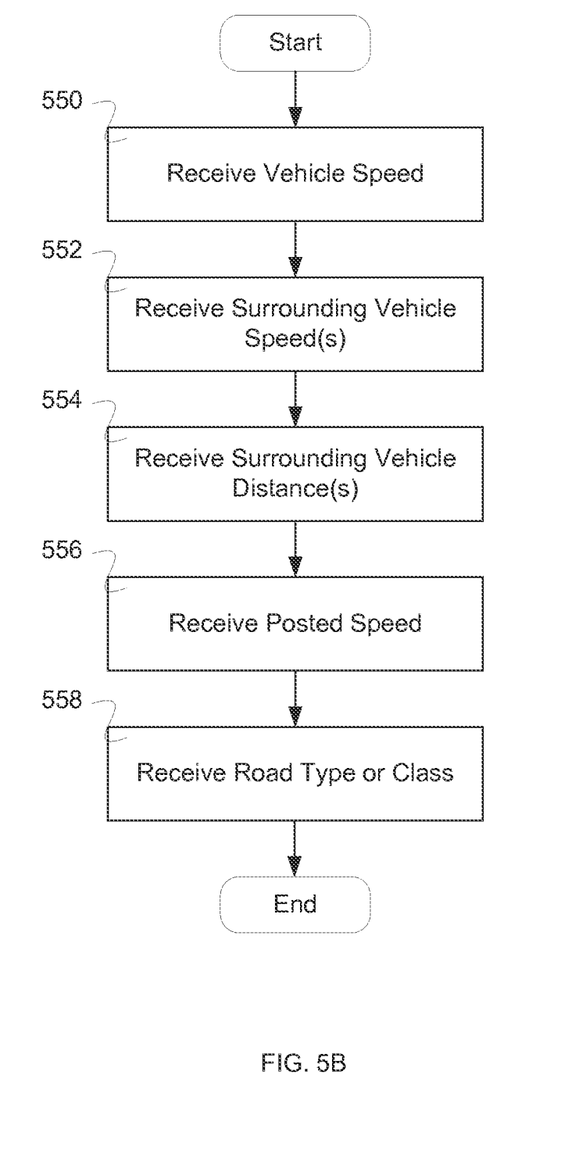
FIG. 5B is a flow diagram illustrating an embodiment of a process for receiving vehicle data and road data.

FIG. 5B is a flow diagram illustrating an embodiment of a process for receiving vehicle data and road data. In some embodiments, the process of FIG. 5B is used to implement 500 of FIG. 5A. In the example shown, in 550 a vehicle speed is received. For example, a vehicle speed comprises a speedometer speed, a GPS measured speed, an event recorder measured speed, a video measured speed, or any other appropriate speed measurement. In 552, surrounding vehicle speed(s) is/are received. For example, a speed of one or more nearby vehicles is/are received. In various embodiments, vehicle speed is determined using an analysis of a video stream, an analysis of stereo images, a Doppler measurement system, a radar system, or any other appropriate manner of determining a nearby vehicle speed. In 554, a surrounding vehicle distance(s) is/are received. For example, a distance to one or more nearby vehicles is/are received. In various embodiments, vehicle distance is determined using an analysis of a video stream, an analysis of stereo images, a time of flight measurement system, a radar system, or any other appropriate manner of determining a distance to a nearby vehicle. In 556, a posted speed is received. For example, a speed associated with a vehicle location is received from a database (e.g., a posted speed limit, a map associated posted speed limit, a sign post posted speed limit, etc.). In some embodiments, in the event that a posted speed limit is not known, then a posted speed limit is estimated based at least in part on a location or a road class or road type. In 558, a road type or road class is received. For example, a road class or type is received from a database corresponding to a vehicle location (e.g., a neighborhood road, a rural road, a city road, a quick travel road, a medium travel road, a highway, a paved road, an unpaved road, a gravel road, etc.).

Figure 5C:
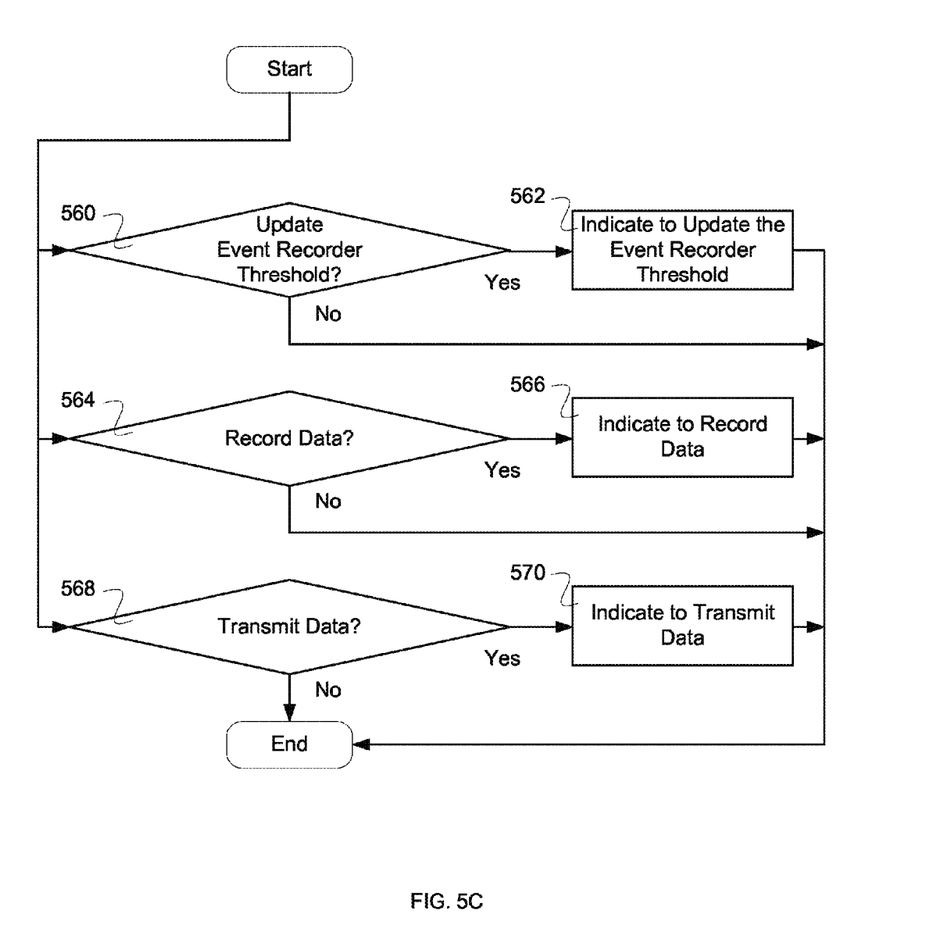
FIG. 5C is a flow diagram illustrating an embodiment of a process for determining a decision based on traffic proxy measure.

FIG. 5C is a flow diagram illustrating an embodiment of a process for determining a decision based on traffic proxy measure. In some embodiments, the process of FIG. 5C is used to implement 504 of FIG. 5A. In the example shown, in 560 it is determined whether to update an event recorder threshold. In some embodiments, it is determined whether to update the event recorder threshold based at least in part on the traffic proxy measure. In the event it is determined not to update the event recorder threshold, the process ends. In the event it is determined to update the event recorder threshold, control passes to 562. In 562, it is indicated to update the event recorder threshold, and the process ends. In some embodiments, it is indicated to update the event recorder threshold to a sensitive setting in the event the traffic proxy measure is above a threshold, and it is indicated to update the event recorder threshold to an insensitive setting in the event the traffic proxy measure is below a threshold. In some embodiments, it is indicated to change the event recorder threshold continuously with the traffic proxy measure. In some embodiments, it is indicated to update the event recorder threshold to a high value in the event the traffic proxy measure is above a threshold, and it is indicated to update the event recorder threshold to a low value in the event the traffic proxy measure is below a threshold. In 564 it is determined whether to record data. In some embodiments, it is determined whether to record event recorder data based at least in part on the traffic proxy measure. In the event it is determined not to record data, the process ends. In the event it is determined to record data, control passes to 566. In 566, it is indicated to record data and the process ends. In some embodiments, it is indicated to record data in the event the traffic proxy measure is above or below a threshold. In 568 it is determined whether to transmit data. In some embodiments, it is determined whether to transmit event recorder data based at least in part on the traffic proxy measure. In the event it is determined not to transmit data, the process ends. In the event it is determined to transmit data, control passes to 570. In 570, it is indicated to transmit data, and the process ends. In some embodiments, it is indicated to transmit data in the event the traffic proxy measure is above or below a threshold.

Figure 6:
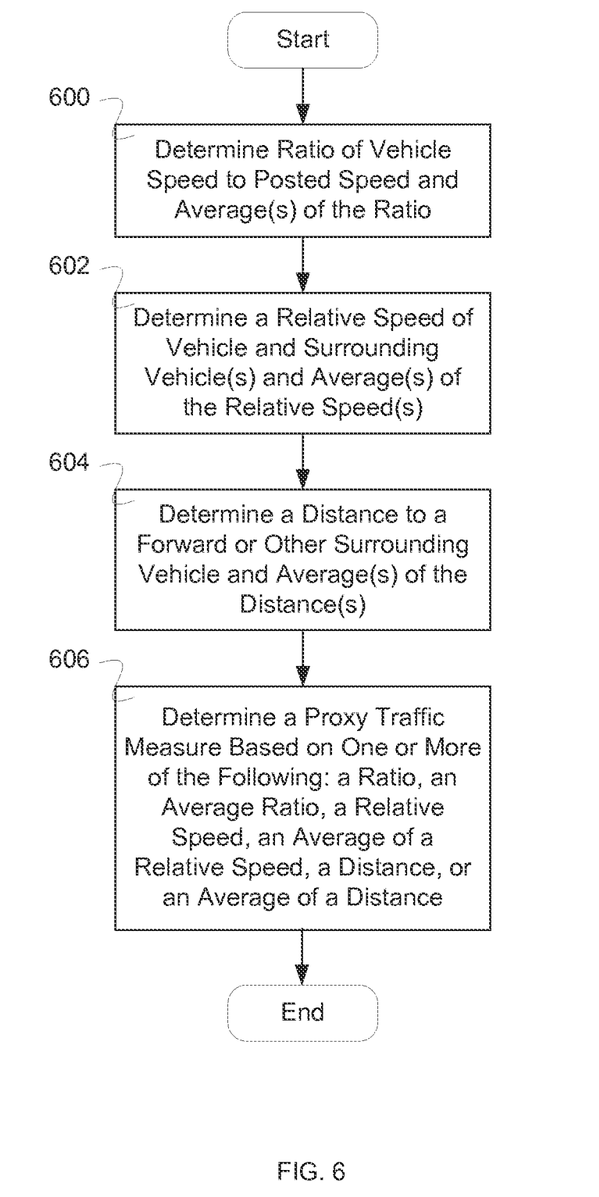
FIG. 6 is a flow diagram illustrating an embodiment of a process for determining a traffic proxy measure based at least in part on the vehicle speed and the posted speed.

FIG. 6 is a flow diagram illustrating an embodiment of a process for determining a traffic proxy measure based at least in part on the vehicle speed and the posted speed. In some embodiments, the process of FIG. 6 implements 502 of FIG. 5A. In the example shown, in 600, the ratio of the vehicle speed to the posted speed and average(s) of the ratio are determined. For example, a sample rate ratio is calculated for the vehicle speed over the posted speed and averages over a time window and/or over a trip or session are calculated and stored. In 602, a relative speed of vehicle and surrounding vehicle(s) and average(s) of the relative speed(s) are determined. For example, the relative speed(s) of one or more vehicles is/are determined compared to the driver's vehicle In various embodiments, the relative speed is determined using image analysis, video analysis, a sonar system, a Doppler system, a radar system, or any other appropriate system. In 604, a distance between the vehicle and surrounding vehicle(s) and average(s) of the distance(s) are determined. For example, the distance to one or more vehicles is/are determined compared to the driver's vehicle In various embodiments, the distance is determined using image analysis, video analysis, a sonar system, a Doppler system, a radar system, or any other appropriate system. In 606, a proxy traffic measure is determined based on one or more of the following: a ratio, an average ratio, a relative speed, an average of relative speed, a distance, or an average of a distance. For example, the ratio of the vehicle speed and the posted speed is used or the average ratio to determine a traffic proxy measure. In some embodiments, the relative speed of surrounding vehicle(s) is used to interpret the ratio for determining a traffic proxy measure (e.g., surrounding vehicles moving slower or faster lead to different traffic proxy estimates). In some embodiments, the distance to a surrounding vehicle is used to determine a traffic proxy measure. In some embodiments, a distance to a forward vehicle is used to determine a traffic proxy measure.

Figure 7:
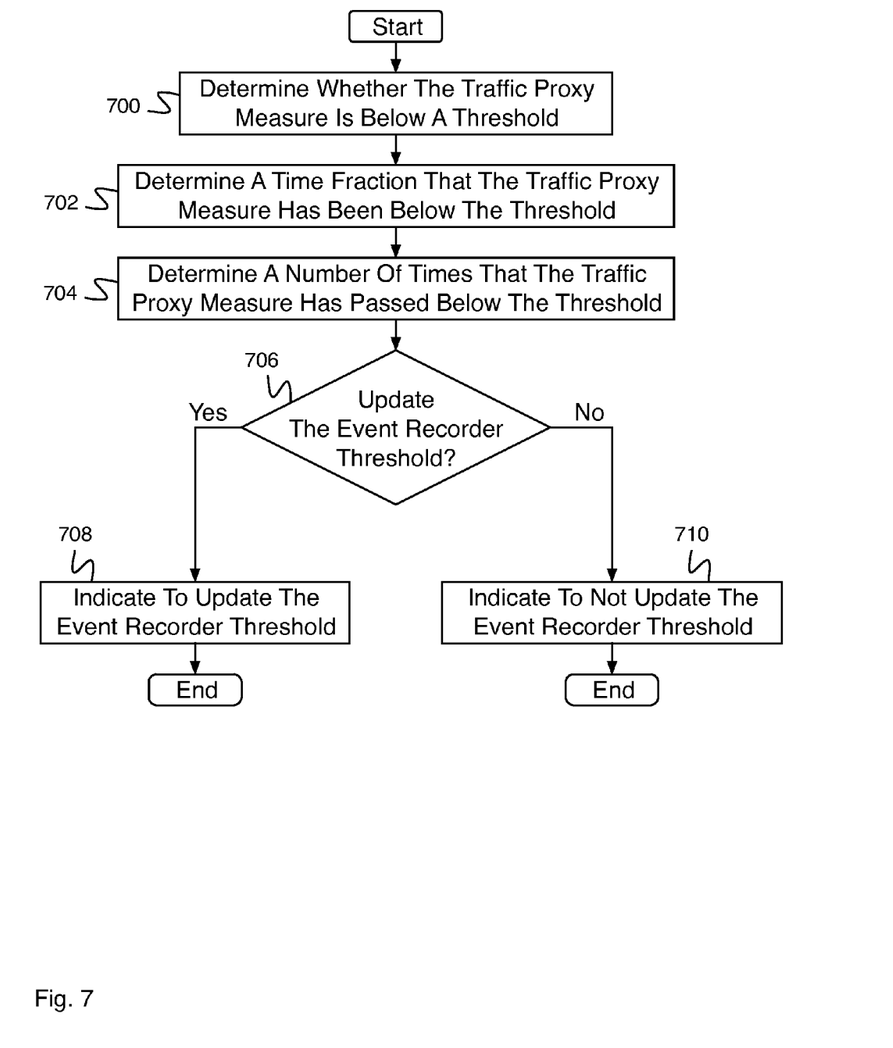
FIG. 7 is a flow diagram illustrating an embodiment of a process for determining whether to update an event recorder threshold.

FIG. 7 is a flow diagram illustrating an embodiment of a process for determining whether to update an event recorder threshold. In some embodiments, the process of FIG. 7 implements 504 of FIG. 5. In the example shown, in 700, it is determined whether the traffic proxy measure is below a threshold. In some embodiments, the threshold is much less than 1. In various embodiments, the threshold is 0.1, 0.2, 0.3, 0.4, or any other appropriate value. In 702, a time fraction that the traffic proxy measure has been below the threshold is determined (e.g., the fraction of the last minute, the last hour, the last day, etc. that the traffic proxy measure has been below the threshold). For example, consider a car driving on a city road with posted speed limit of 35 Mph; the vehicle speed is monitored over the 3 minute windows; excluding instances where the vehicle is stopped at intersections, it is determined what faction of the time the ratio between the vehicle speed and the posted speed stayed under each threshold level; for example, it is calculated that 2% of the time the ratio was under a threshold value of 0.1, 8% of the time under 0.2, 21% under 0.3, 45% under 0.4, 78% under 0.5, 88% under 0.6, and 100% under 0.7. In 704, a number of times that the traffic proxy measure has passed below the threshold is determined (e.g., the number of times that the traffic proxy measure has crossed from above the threshold to below the threshold in the last minute, the last hour, the last day, etc.). For example, consider the case of a car driving on a freeway with posted speed limit of 65 Mph and where the vehicle sensors report its speed 10 times per second; the vehicle speed is monitored over the 5 minute windows, which provides 300 estimations of the ratio between the vehicle speed and the posted speed; it is calculated how many times the ratio was under each threshold; for example, the traffic proxy measure was not under a threshold value of 0.5, was under the threshold value of 0.6 8 times, under 0.7 25 times, was under 0.8 55 times, was under 0.9 122 times and was under 1 300 times. In 706, it is determined whether to update the event recorder threshold. In some embodiments, the likelihood of detecting an event decreases as the event recorder threshold increases and the event recorder threshold should be a high value in the event that the traffic proxy measure is above a threshold (e.g., light traffic) and the event recorder threshold should be a low value in the event the traffic proxy measure is below a threshold (e.g., heavy traffic). In some embodiments, the event recorder threshold should be a high value in the event that the time fraction that the traffic proxy measure has been below the threshold is below a threshold and the event recorder threshold should be a low value in the event that the time fraction that the traffic proxy measure has been below the threshold is above a threshold. For example, in the event that 75% of the time the vehicle had a traffic proxy measure under 0.5 during the a 3 minute window it is concluded that there is heavy traffic and the event recorder threshold should be set to a low value; this is the case for the car driving in the city road with posted speed limit of 35 Mph described above. In some embodiments, the event recorder threshold should be a high value in the event that the number of times that the traffic proxy measure has passed below the threshold is below a threshold and the event recorder threshold should be a low value in the event that the number of times that the traffic proxy measure has passed below the threshold is above a threshold. For example, in the event that the traffic proxy has not been below 0.5 and has been below 0.9 less than 25% of the times then it is assumed that the traffic is low and the event recorder threshold should be a high value; this is the case of the car driving in the freeway with posted speed limit of 65 Mph described above. In the event it is determined in 706 to update the event recorder threshold, control passes to 708. In 708, the process indicates to update the event recorder threshold, and the process ends. In the event it is determined in 706 to not update the event recorder threshold, control passes to 708. In 708, the process indicates to not update the event recorder threshold.

Figure 8:
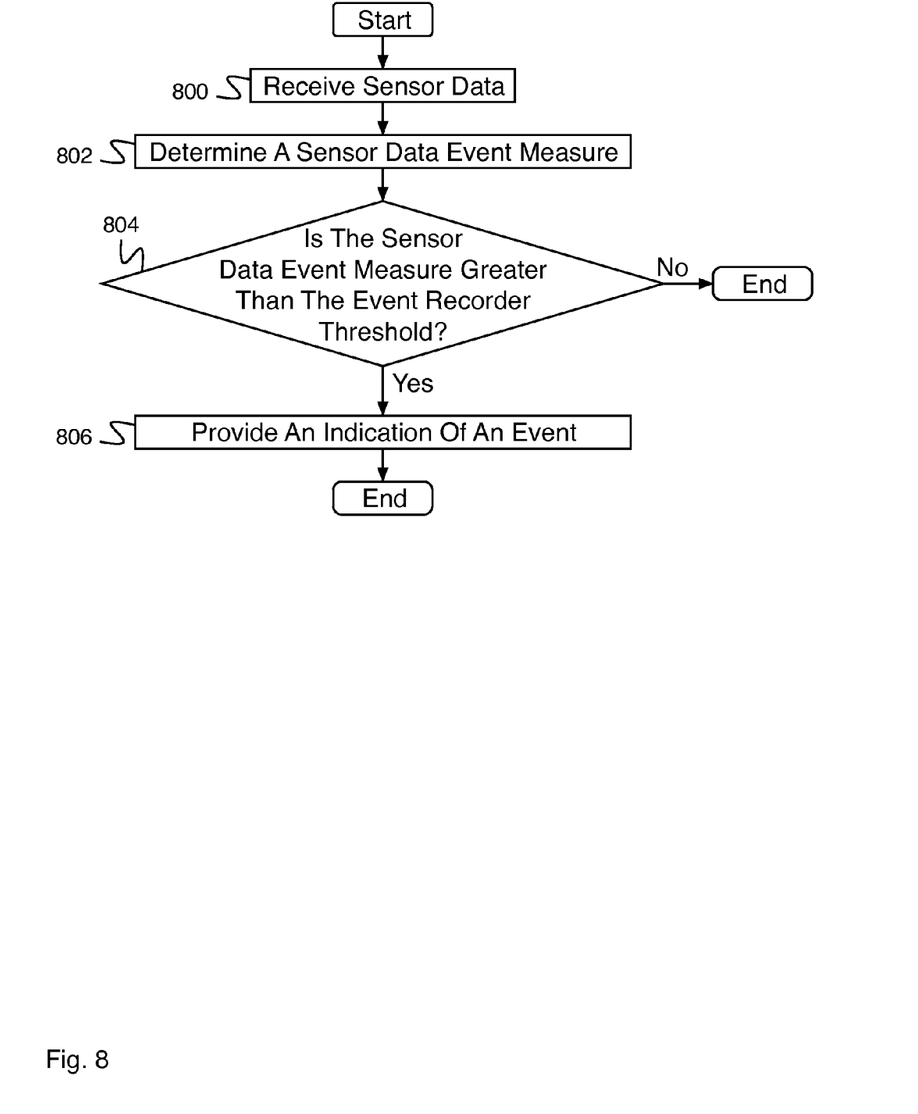
FIG. 8 is a flow diagram illustrating an embodiment of a process for indicating an event.

FIG. 8 is a flow diagram illustrating an embodiment of a process for indicating an event. In some embodiments, the process of FIG. 8 is executed by a vehicle event recorder (e.g., vehicle event recorder 200 of FIG. 2) for indicating an anomalous event. In 800, sensor data is received. In various embodiments, sensor data comprises sensor data received over a communications interface, sensor data received over a sensor data, sensor data determined from sensors within the vehicle event recorder, or any other appropriate sensor data. In 802, a sensor data event measure is determined. In various embodiments, determining a sensor data event measure comprises filtering sensor data, normalizing sensor data, linearly processing sensor data, nonlinearly processing sensor data, or determining a sensor data event measure in any other way. In 804, it is determined whether the sensor data event measure is greater than the event recorder threshold. In the event it is determined that the sensor data event measure is not greater than the event recorder threshold, the process ends. In the event it is determined that the sensor data event measure is greater than the event recorder threshold, control passes to 806. In 806, an indication of an event is provided. In some embodiments, in the event it is determined that the sensor data event measure is greater than the event recorder threshold in 804, video capture is triggered (e.g., the event recorder threshold comprises a video capture threshold). In some embodiments, in the event it is determined that the sensor data event measure is greater than the event recorder threshold in 804, an event is triggered (e.g., the event recorder threshold comprises an event trigger threshold). In some embodiments, in the event that an indication is received that an event has been triggered, data associated with the event is stored (e.g., stored on the event recorder and/or cause to be stored on a server).

In some embodiments, a second event threshold is used to determine whether the event is transmitted to a server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for determining an event recorder threshold using a traffic proxy measure, comprising:
an input interface to:
receive a vehicle data and a road data; and
a processor to:
determine a traffic proxy measure based at least in part on the vehicle data and the road data;
determine whether to update the event recorder threshold based at least in part on the traffic proxy measure; and
in the event that it is determined to update the event recorder threshold, update the event recorder threshold.
2. The system of claim 1, wherein the vehicle data comprises a vehicle speed, wherein the vehicle speed is received from a GPS.
3. The system of claim 1, wherein the vehicle data comprises a vehicle speed, wherein the vehicle speed is received from a vehicle sensor.
4. The system of claim 1, wherein the vehicle data comprises a speed of one or more nearby vehicles.
5. The system of claim 1, wherein the vehicle data comprises a distance to one or more nearby vehicles.
6. The system of claim 1, wherein the road data comprises a posted speed, wherein the posted speed is determined using a posted speed database.
7. The system of claim 1, wherein the road data comprises a posted speed, wherein the posted speed is determined using map data.
8. The system of claim 1, wherein the road data comprises a posted speed, wherein the posted speed is determined using GPS data.
9. The system of claim 1, wherein the road data comprises a posted speed, wherein the posted speed is determined using a captured image of a speed limit sign.
10. The system of claim 9, wherein the captured image of the speed limit sign is captured using an event recorder.
11. The system of claim 1, wherein the road data comprises a road type, wherein the road type is determined using a road type database.
12. The system of claim 1, wherein the road data comprises a road type, wherein the road type is determined using map data.
13. The system of claim 1, wherein the road data comprises a road type, wherein the road type is determined using GPS data.
14. The system of claim 1, wherein the traffic proxy measure is based at least in part on a ratio of a vehicle speed and a posted speed.
15. The system of claim 1, wherein determining whether to update the event recorder threshold is based at least in part on the traffic proxy measure being less than a traffic proxy measure threshold.
16. The system of claim 15, wherein the traffic proxy measure threshold is one of the following: 0.9, 0.5, 0.3, 0.2, or 0.1.
17. The system of claim 1, wherein determining whether to update the event recorder threshold is based at least in part on the traffic proxy measure being below a traffic proxy measure threshold for more than a threshold fraction of time.
18. The system of claim 1, wherein determining whether to update the event recorder threshold is based at least in part on the traffic proxy measure passing below a traffic proxy measure threshold more than a threshold number of times.
19. The system of claim 1, wherein the event recorder threshold comprises an event trigger threshold.
20. The system of claim 1, wherein the processor is further to determine whether to record event data.
21. The system of claim 1, wherein the processor is further to determine whether to transmit event data.
22. A method for determining an event recorder threshold using a traffic proxy measure, comprising:

receiving a vehicle data and a road data;

determining, using a processor, a traffic proxy measure based at least in part on the vehicle data and road data;

determining whether to update the event recorder threshold based at least in part on the traffic proxy measure; and in the event that it is determined to update the event recorder threshold, updating the event recorder threshold.

23. A computer program product for determining an event recorder threshold using a traffic proxy measure, the computer program product being embodied in a non-transitory computer readable storage medium and comprising computer instructions for:

receiving a vehicle data and a road data;

determining a traffic proxy measure based at least in part on the vehicle data and road data;

determining whether to update the event recorder threshold based at least in part on the traffic proxy measure; and in the event that it is determined to update the event recorder threshold, updating the event recorder threshold.

\* \* \* \* \*